US008955494B2

United States Patent
Nakamura

(10) Patent No.: US 8,955,494 B2
(45) Date of Patent: Feb. 17, 2015

(54) CONTROL APPARATUS FOR AND CONTROL METHOD OF CONTROLLING VARIABLE VALVE MECHANISM IN HYBRID VEHICLE

(75) Inventor: Yoshitatsu Nakamura, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 799 days.

(21) Appl. No.: 13/048,313

(22) Filed: Mar. 15, 2011

(65) Prior Publication Data

US 2011/0231077 A1 Sep. 22, 2011

(30) Foreign Application Priority Data

Mar. 16, 2010 (JP) ................................ 2010-059011

(51) Int. Cl.
*F02D 13/00* (2006.01)
*F02D 29/02* (2006.01)
*B60K 6/48* (2007.10)
(Continued)

(52) U.S. Cl.
CPC . *F02D 29/02* (2013.01); *B60K 6/48* (2013.01); *B60W 10/06* (2013.01); *B60W 20/00* (2013.01); *B60W 30/192* (2013.01); *F02D 13/0226* (2013.01); *F02D 13/0238* (2013.01); *F02N 19/004* (2013.01); *F02N 19/005* (2013.01); *F02B 2275/16* (2013.01); *F02D 2013/0292* (2013.01); *F02N 2019/008* (2013.01); *F02N 2200/022* (2013.01); *Y02T 10/6221* (2013.01); *Y02T 10/18* (2013.01)
USPC ........................................ 123/345; 123/90.15

(58) Field of Classification Search
USPC ............. 123/321, 322, 345–348, 90.1, 90.15, 123/90.16
See application file for complete search history.

(56) References Cited

U.S. PATENT DOCUMENTS 6,505,586 B1 1/2003 Sato et al.
7,690,338 B2 4/2010 Kawada
(Continued)

FOREIGN PATENT DOCUMENTS

JP 2001-50063 A 2/2001
JP 2002-188472 A 7/2002
(Continued)

OTHER PUBLICATIONS

Japanese Office Action with English translation dated Jun. 19, 2012 (four (4) pages).

(Continued)

*Primary Examiner* — John Kwon
(74) *Attorney, Agent, or Firm* — Crowell & Moring LLP

(57) ABSTRACT

In a control apparatus for and a control method of controlling a variable valve mechanism in a hybrid vehicle, just before an engine is stopped in response to an automatic stop request, an intake valve closing timing is controlled to be set to a second closing timing near the bottom dead center to stabilize an engine stop position; when the engine is stopped, the intake valve closing timing is retarded from the second closing timing to a first closing timing that is suitable for engine start; the engine is started with the closing timing being set to the first closing timing, and the intake valve closing timing is changed towards the retard angle side beyond closing timing against rev-up of the engine just after completion of engine start, so that the rev-up can be suppressed with good response while controlling the intake valve closing timing as required for starting the engine.

20 Claims, 6 Drawing Sheets

(51) Int. Cl.
*B60W 10/06* (2006.01)
*B60W 20/00* (2006.01)
*B60W 30/192* (2012.01)
*F02D 13/02* (2006.01)
*F02N 19/00* (2010.01)

(56) References Cited

U.S. PATENT DOCUMENTS

| | | | |
|---|---|---|---|
| 7,726,270 B2 | 6/2010 | Miwa et al. | |
| 2010/0139591 A1* | 6/2010 | Nakamura | 123/90.16 |
| 2010/0228461 A1* | 9/2010 | Sugai et al. | 701/101 |

FOREIGN PATENT DOCUMENTS

| | | |
|---|---|---|
| JP | 2005-146908 A | 6/2005 |
| JP | 2006-138299 A | 6/2006 |
| JP | 2007-309276 A | 11/2007 |
| JP | 2008-196316 A | 8/2008 |
| JP | 2008-286188 A | 11/2008 |
| JP | 2009-156150 A | 7/2009 |
| JP | 2009-167920 A | 7/2009 |

OTHER PUBLICATIONS

Japanese Office Action with English Translation dated Sep. 11, 2012 (five (5) pages).

* cited by examiner

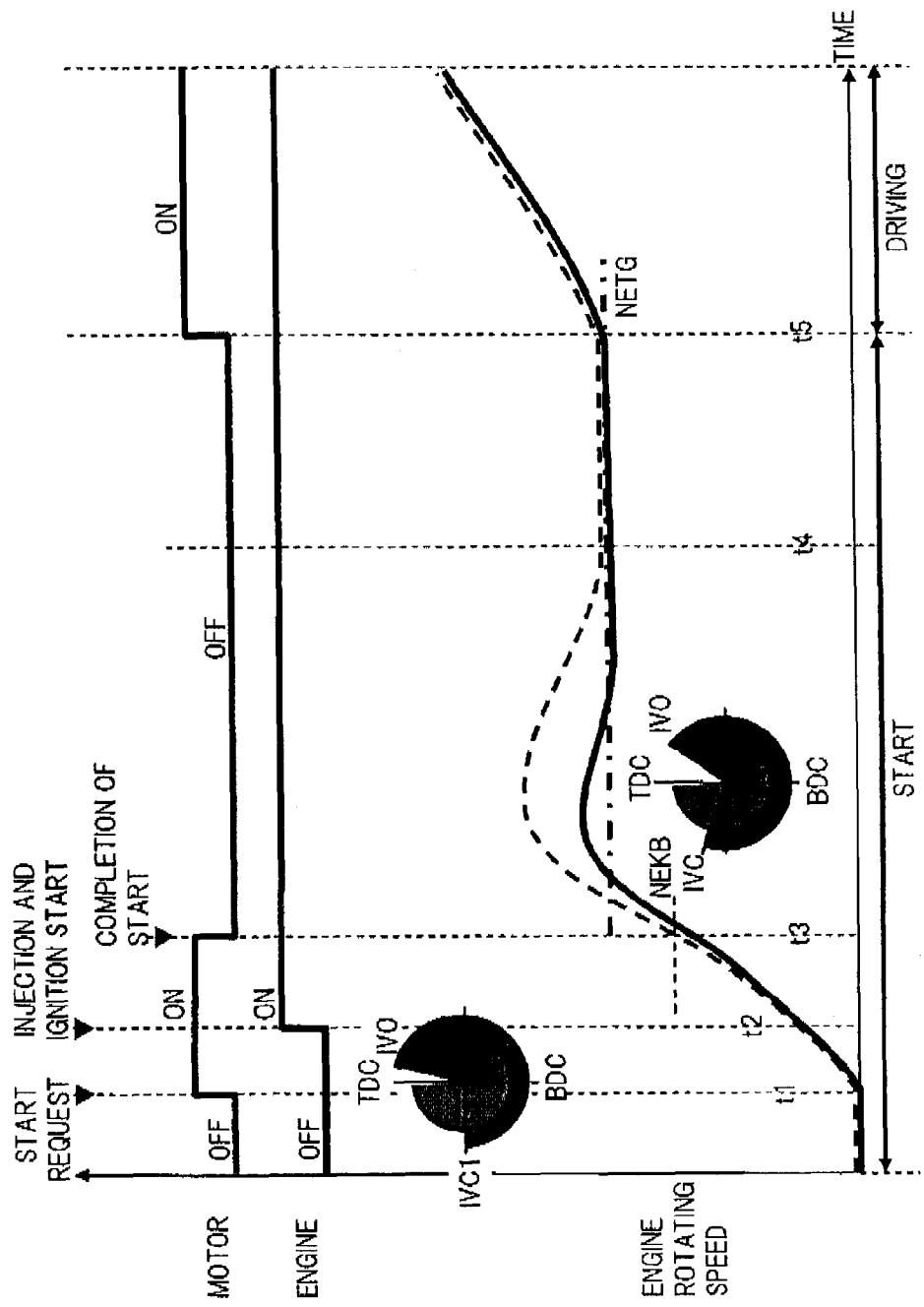

CONTROL APPARATUS FOR AND CONTROL METHOD OF CONTROLLING VARIABLE VALVE MECHANISM IN HYBRID VEHICLE

BACKGROUND OF THE INVENTION

1. Field of the Invention

The present invention relates to a control apparatus for and to a control method of controlling a variable valve mechanism in a hybrid vehicle, and in particular, relates to a control apparatus for and to a control method of controlling the aforementioned variable valve mechanism in a hybrid vehicle which includes an engine having a variable valve mechanism that allows at least a closing timing of an intake valve to be changed, and includes an electric motor directly connected to a crankshaft of this engine.

2. Description of Related Art

Japanese Laid-Open (Kokai) Patent Application Publication No. 2008-196316 discloses suppressing rev-up of an engine by controlling an intake valve closing timing to a timing near the bottom dead center when the engine is started.

For a hybrid vehicle having an engine and an electric motor that is directly connected to a crankshaft of the engine, in order to ensure a stable and good engine startability when restarting an automatically stopped engine, it is preferable that an intake valve closing timing be set to a timing near 80 degrees after the bottom dead center.

However, the engine revs up at an intake valve closing timing which is suitable for engine start. At this time, however, if an attempt is made to suppress the rev-up of the engine by shifting the intake valve closing timing close to the bottom dead center, a problem arises in that it is difficult to suppress the rev-up with good response because a change amount of the intake valve closing timing is large.

SUMMARY OF THE INVENTION

In view of the foregoing, an object of the invention is to provide a control apparatus for and a control method of controlling a variable valve mechanism in a hybrid vehicle, in which rev-up of an engine can be suppressed with good response while controlling a closing timing to be set to a timing that is required when an engine is started.

To achieve the aforementioned object, according to the present invention, a control apparatus for controlling a variable valve mechanism in a hybrid vehicle includes:

a first control unit which controls the variable valve mechanism while the engine stops in response to a stop request, so that an intake valve closing timing is controlled to be set to a first closing timing that is suitable for engine start, and a second control unit which when restarting the engine, controls the variable valve mechanism to the rev-up of the engine just after completion of engine start, so that the intake valve closing timing is changed toward a retard angle side beyond the first closing timing.

Furthermore, according to the present invention, a control method of controlling a variable valve mechanism in a hybrid vehicle includes the steps of:

controlling the variable valve mechanism during engine stop in response to a stop request so that an intake valve closing timing is controlled to be set to a first closing timing that is suitable for engine start, and when restarting the engine, controlling the variable valve mechanism to the rev-up of the engine just after completion of engine start, so that the intake valve closing timing is changed toward a retard angle side beyond the first closing timing.

Other objects and features of this invention will be understood from the following description with reference to the accompanying drawings.

BRIEF DESCRIPTION OF THE DRAWINGS

FIG. 6 is a time chart illustrating a closing timing at engine start and change of engine rotating speed according to an embodiment of the invention.

DESCRIPTION OF THE PREFERRED EMBODIMENTS

Figure 1:
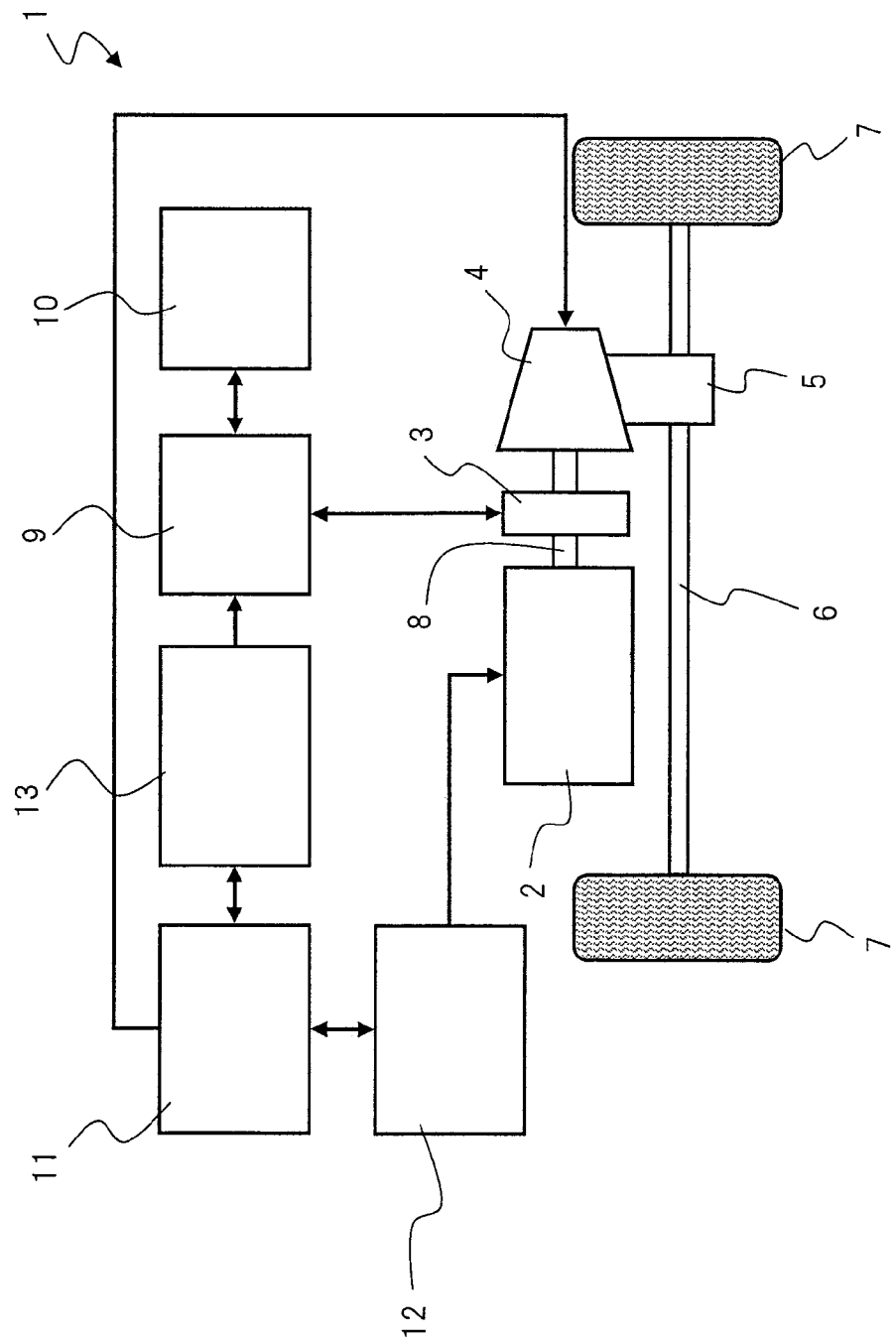
FIG. 1 illustrates a general configuration of a hybrid vehicle according to an embodiment of the invention.

FIG. 1 illustrates a general configuration of a drive of a hybrid vehicle according to an embodiment of the invention.

A hybrid vehicle 1 illustrated in FIG. 1 has both an engine 2 and an electric motor 3 as drive sources for running a vehicle.

The driving force exerted by the engine 2 is transferred to driving wheels 7 and 7 via a transmission 4, a differential gear 5, and an axle 6.

A rotor of electric motor 3 is directly connected to an output shaft 8 between engine 2 and transmission 4.

Output shaft 8 and the rotor of electric motor 3 may be connected via a power transmission mechanism such as a gear, etc.

Electric motor 3 is a motor generator. When electric motor 3 operates as an electric motor, it outputs driving force. Furthermore, when electric motor 3 is rotationally driven by engine 2 or by driving wheels 7 and 7, electric motor 3 operates as an electric generator and outputs electricity.

An inverter 9 converts direct-current power that is stored in a battery 10 to alternating-current power, and supplies to electric motor 3. Furthermore, when using regenerative braking or when generating electricity, inverter 9 converts alternating-current power from electric motor 3 to direct-current power, and supplies the direct-current power to battery 10.

An integration controller 11 receives signals from various switches and sensors for detecting vehicle operating conditions, determines an operating mode based on the received signals, and calculates and outputs a torque command value of engine 2 and a torque command value of electric motor 3.

As various sensors and switches which supply signals to integration controller 11, a key switch, an accelerator opening sensor, a brake switch, speed sensor, a battery voltage sensor, etc., are provided.

Furthermore, integration controller 11 includes a microcomputer, and outputs operation commands associated with an operating mode, a torque command value, etc., to an engine controller 12 which controls engine 2 and to a motor generator controller 13 which controls electric motor 3.

Integration controller 11, engine controller 12, and motor generator controller 13 can communicate with one another. Motor generator controller 13 generates and outputs a PWM signal for controlling inverter 9 based on information including an operation command transmitted from integration controller 11, rpm and current of electric motor 3, etc.

Figure 2:
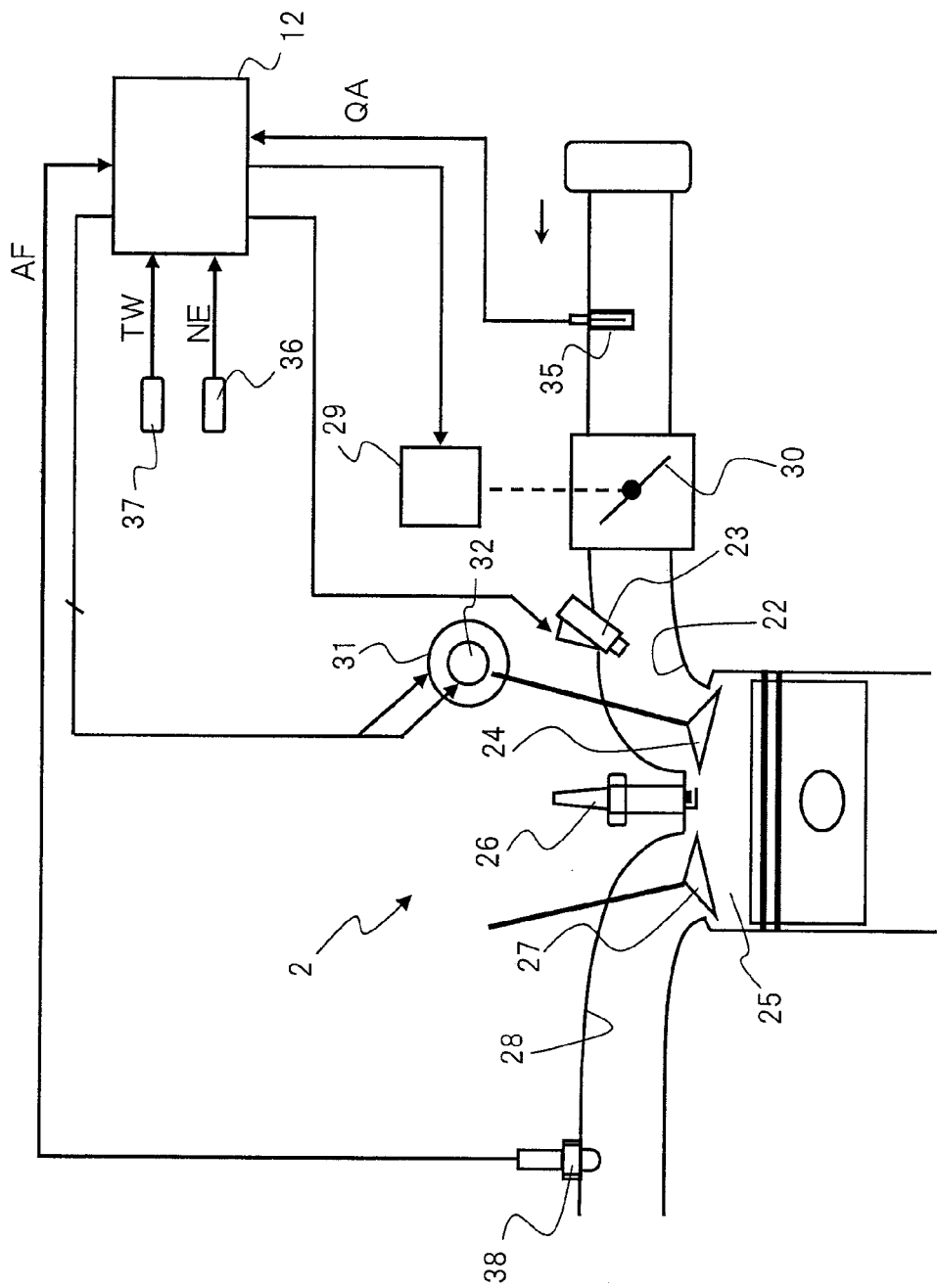
FIG. 2 illustrates a configuration of an engine according to an embodiment of the invention.

FIG. 2 is a configuration diagram of engine 2 that is an internal combustion engine.

A fuel injection valve 23 is provided in an air intake passage 22 of engine 2. When this fuel injection valve 23 opens, fuel is injected into engine 2.

The fuel injected from fuel injection valve 23 is introduced into a combustion chamber 25 via an intake valve 24 together with air, and the mixture of fuel and air is ignited by a spark ignition by a spark plug 26. The combustion gas within combustion chamber 25 is discharged to an exhaust passage 28 via an exhaust valve 27.

The internal combustion engine may be a gasoline direct injection engine in which fuel is directly injected into combustion chamber 25 by fuel injection valve 23.

An electronically controlled throttle 30 which is opened and closed by a throttle motor 29 is provided in air intake passage 22 upstream of a position at which fuel injection valve 23 is disposed. Intake air flow rate into engine 2 is controlled by opening of this electronically controlled throttle 30.

Furthermore, as a variable valve mechanism which allows the valve opening characteristics of intake valve 24 to be changed, a lift-variable mechanism 31 and a phase-variable mechanism 32 are also provided. Specifically, lift-variable mechanism 31 enables simultaneous and continuous change of the valve lift amount and valve working angle of intake valve 24, and phase-variable mechanism 32 continuously changes the rotating phase of an intake camshaft with respect to a crankshaft of engine 2 so as to allow the center phase of the valve working angle of intake valve 24 to be continuously changed.

As used herein, the valve lift amount which is allowed to be changed by lift-variable mechanism 31 is the maximum valve lift amount, and the valve working angle is a crank angle from an opening timing IVO to a closing timing IVC of intake valve 24.

Various known mechanisms may be used as lift-variable mechanism 31 and phase-variable mechanism 32. For example, as disclosed in Japanese Laid-Open (Kokai) Patent Application Publication No. 2008-196316, a mechanism for displacing a rocker arm by rotating a control shaft by an actuator may be used as lift-variable mechanism 31. Furthermore, for example, as disclosed in Japanese Laid-Open (Kokai) Patent Application Publication No. 2001-050063, a mechanism for rotating phase change in which a retarded-angle-side-hydraulic chamber and an advance-angle-side-hydraulic chamber are formed on opposite sides of a vane so as to control oil pressures in the respective hydraulic chambers, or a mechanism for relatively rotating an intake camshaft with respect to a crankshaft using a gear may be used as phase-variable mechanism 32.

Engine controller 12 includes a microcomputer, and controls operations as follows: fuel injection of fuel injection valve 23, spark ignition of spark plug 26, opening of electronically controlled throttle 30, valve lift amount change and valve working angle change performed by lift-variable mechanism 31, and center phase change of the valve working angle by phase-variable mechanism 32.

Apart from engine controller 12, a valve controller for performing drive control of aforementioned lift-variable mechanism 31 may be provided. Furthermore, engine controller 12 can output a target valve lift amount and a target valve working angle to the valve controller, and the valve controller can perform feedback control of aforementioned lift variable mechanism 31 based on these target values.

In addition, engine controller 12 receives detection signals from an air flow sensor 35 for detecting intake air flow rate QA to engine 2, a rotation sensor 36 for detecting rotating speed NErpm of engine 2, a water temperature sensor 37 for detecting a cooling water temperature TW of engine 2, and an air-fuel ratio sensor 38 for detecting an air-fuel ratio AF of engine 2 according to an oxygen concentration of exhaust gas. etc. and receives operation commands such as an operating mode, a torque command value, etc., which are transmitted from integration controller 11.

Engine controller 12 adjust the intake air flow rate into engine 2 by controlling operation and stop of engine 2 according to an operation mode, and controlling opening of electrically controlled throttle 30 according to a torque command value.

Furthermore, engine controller 12 computes an injection pulse width TI to be output to fuel injection valve 23 based on an intake air flow rate QA, an engine rotating speed NErpm, a cooling water temperature TW, an air-fuel ratio AF, etc., and outputs an injection pulse signal representing the computed injection pulse width TI to each fuel injection valve 23 according to a specific stroke (piston position) of each cylinder.

Furthermore, engine controller 12 determines an ignition timing, a valve-lift amount, a valve working angle, and the center phase of the valve working angle of valve 24, based on an engine load, an engine rotating speed NE, a cooling water temperature TW, whether or not the engine is during a starting operation, etc., and controls an ignition operation of spark plug 26, and also controls lift-variable mechanism 31 and phase-variable mechanism 32.

In the following, how engine controller 12 controls lift-variable mechanism 31 and phase-variable mechanism 32 during a period from automatic stop to restart of engine 2 will be described in detail with reference to the flowcharts in FIGS. 3 and 4.

Figure 3:
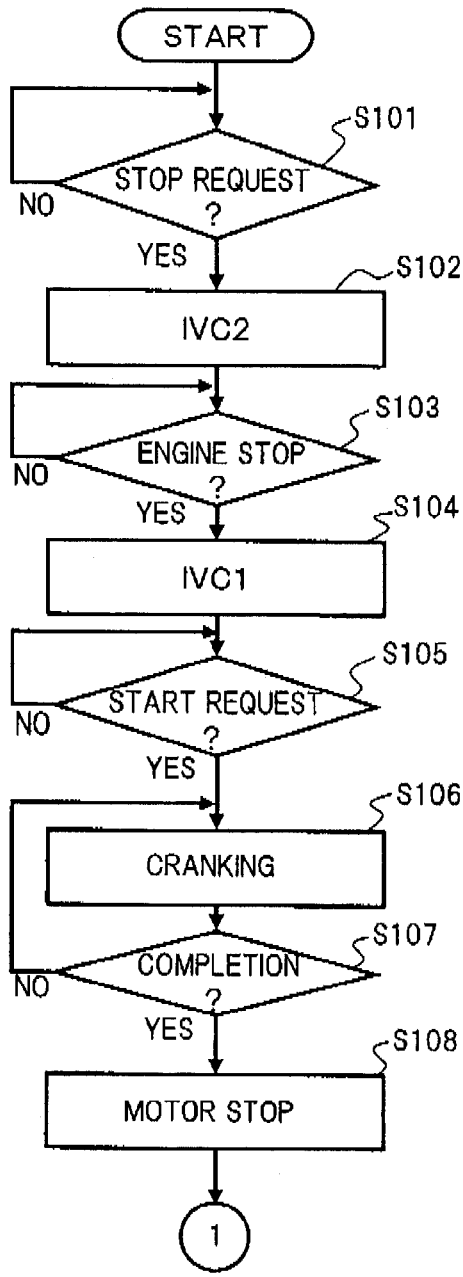
FIG. 3 is a flowchart illustrating control of an intake valve closing timing according to an embodiment of the invention.
Figure 4:
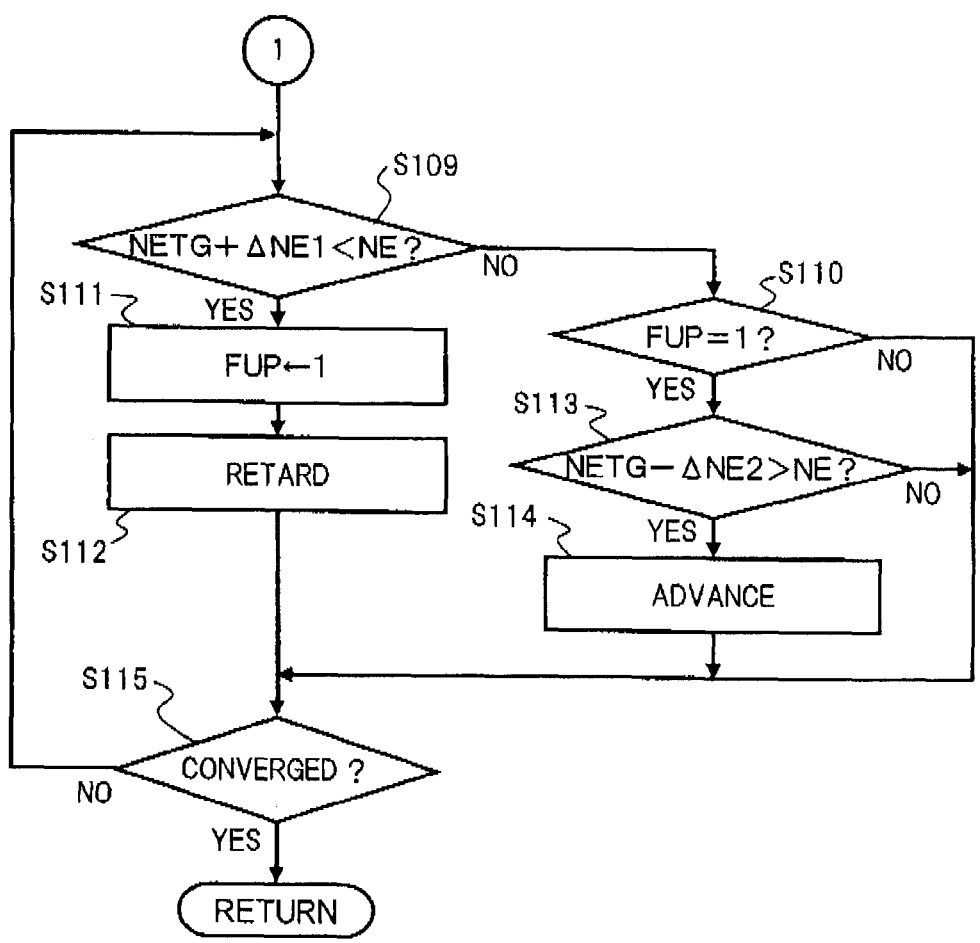
FIG. 4 is a flowchart illustrating control of an intake valve closing timing according to an embodiment of the invention.

Referring to the flowcharts illustrated in FIG. 3 and FIG. 4, first, at step S101, whether or not a stop request for engine 2 occurs based on an operation command transmitted from integration controller 11 is determined.

The stop request for engine 2 is a request to automatically stop engine 2 according to an operation mode, and idle reduction for automatically stopping engine 2 when a vehicle stops is included.

If it is determined that a stop request for engine 2 occurs, the routine advances to step S102. in which in parallel with an automatic engine 2 stop process by stopping the fuel injection of fuel injection valve 23 and stopping the spark ignition by spark plug 26, the closing timing IVC of intake valve 24 is advanced to a timing just before stop of engine 2, so that the closing timing IVC is controlled to be set to a second closing timing IVC2 that is a timing at or just after the bottom dead center BDC.

The second closing timing IVC2 is, for example, set to fall within a range from 30 degrees after the bottom dead center to the bottom dead center.

Figure 5:
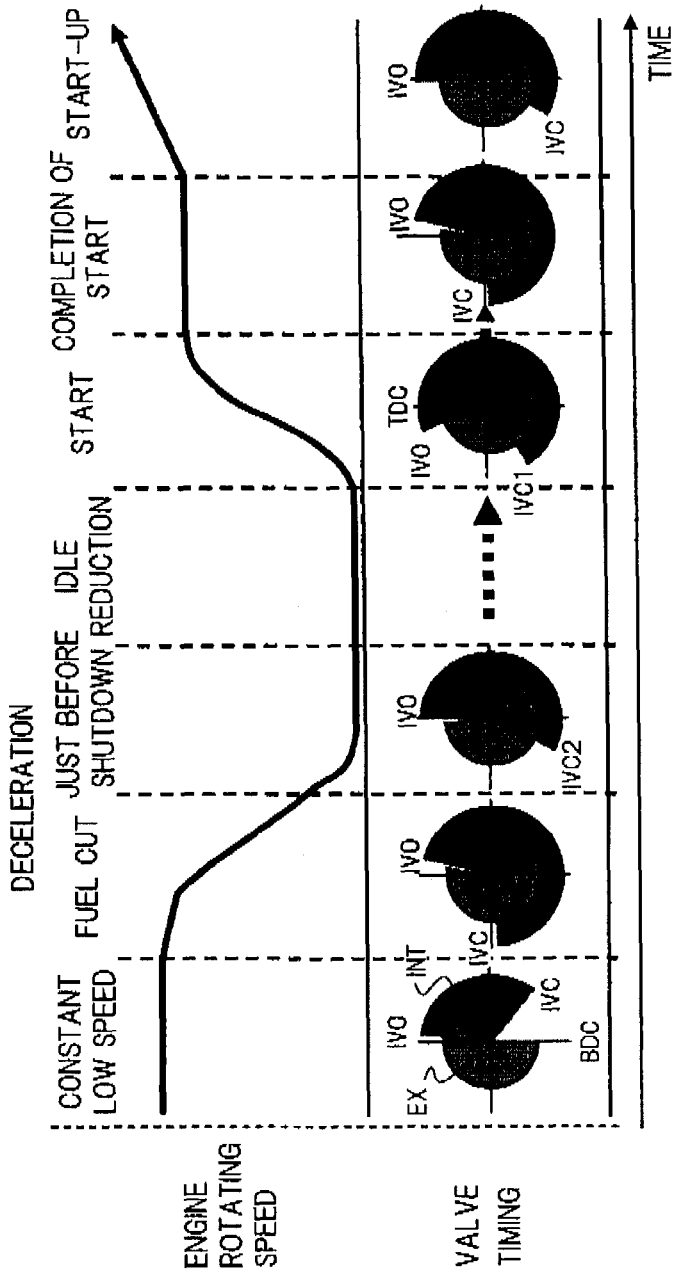
FIG. 5 is a time chart illustrating change of a closing timing during a period from engine stop to engine start.

As shown in FIG. 5, for example, when engine 2 is automatically shut-down by slowing down the vehicle that is driving at a slow regular pace, and when fuel cut is implemented during the slowing down, a fuel efficiency and an energy regeneration efficiency can be enhanced by decreasing a pumping loss of the engine 2 and increasing power recovery by using electric motor 3 for an electric generator.

In view of the above, during fuel cut and deceleration, the valve working angle of intake valve 24 is increased and the center phase of the valve working angle is retarded, so that the closing timing IVC of intake valve 24 is maximally retarded. Specifically, the closing timing IVC is set around 90 degrees after the bottom dead center.

As the closing timing IVC of intake valve 24 is further retarded from the bottom dead center BDC, an effective compression ratio decreases. Furthermore, since increasing the valve working angle causes the closing timing IVC to be retarded, the situation can be prevented in which the opening timing IVO is retarded from the top dead center so that a negative pressure in a cylinder increase.

As a result, the pumping loss when engine 2 idles during fuel cut is reduced, and mechanical energy that is consumed by the pumping loss can be converted to electric energy, so that fuel efficiency and energy regeneration efficiency are enhanced.

However, when pumping loss of engine 2 is small, a stop position of engine 2 is not stabilized. Variations of stop position cause degradation of startability of engine 2.

For example, if an initial fuel injection is performed in a cylinder that is inactivated in the middle of suction stroke, startup responsibility can be improved. However, even in the same suction stroke, if the cylinder stops working near the end of the suction stroke, a sufficient amount of fuel cannot be introduced into combustion chamber 25.

For this reason, when an engine rotating speed NE decreases, fuel cut is implemented to increase the valve working angle and to retard the center phase of the valve working angle, so that a fuel efficiency and energy regeneration efficiency are enhanced. Furthermore, at a time just before a stop of engine 2, the valve working angle is decreased to stabilize the stop position of engine 2, the center phase of the valve working angle is advanced so that the closing timing IVC is advanced toward the bottom dead center BDC. In addition, the opening timing IVO of intake valve 24 is set near the top dead center TDC.

When the closing timing IVC of intake valve 24 is advanced toward the bottom dead center, the effective compression ratio increases. The resultant high effective compression ratio prevents inertial rotation of engine 2, so that the stop position of engine 2 is stabilized and it becomes possible to form air fuel mixture with high combustion stability by initial injection. As a result, engine startability is improved.

Thus, the aforementioned second closing timing IVC2 is adapted in advance as a position where the stop position of engine 2 can be stabilized.

When the closing timing IVC in a significantly retarded state during fuel cut in vehicle deceleration is advanced to the second closing timing IVC2, the closing timing IVC is advanced due to reduction of the valve working angle by lift-variable mechanism 31. At the same time, the closing timing IVC is advanced also by changing the advance angle of the center phase by phase-variable mechanism 32. Thus, the closing timing IVC of intake valve 24 can be advanced to the second closing timing IVC2 in a short time.

As a result, a control start timing for advancing the closing timing IVC to the second closing timing IVC2 can be delayed, so that energy regeneration can be maximized.

Furthermore, the control start timing for advancing the closing timing IVC to the second closing timing IVC2 can be determined based on comparison between the engine rotating speed NE and a threshold. This threshold is adapted in advance based on a time required for controlling advance of the closing timing IVC to the second closing timing IVC2, etc.

At step S103, after controlling the closing timing IVC to be set to the second closing timing IVC2 when just before a stop of engine 2, whether or not engine 2 is really shut down is determined based on a time during signal supply from rotation sensor 36 is continuously stopped.

When engine 2 stops, the routine advances to step S104 in which as a preparation to restart engine 2, the closing IVC of intake valve 24 is retarded from the second closing timing IVC2 for stabilizing the engine stop position toward a first closing timing IVC1 that is suitable for actuating engine 2.

The aforementioned first closing timing IVC1 is set to a timing, for example, between 60 degrees after the bottom dead center and 110 degrees after the bottom dead center, and more preferably, at near 80 degrees after the bottom dead center.

When engine 2 is restarted from the idle reduction state, since the temperature of engine 2 is high, pre-ignition that is self ignition of fuel before spark-ignition is likely to occur. Furthermore, when engine 2 is restarted from the idle reduction state, it is desired to suppress vibration of engine 2 associated with actuation thereof and to decrease electric power consumption associated with cranking.

In contrast, since the second closing timing IVC2 for stabilizing the engine stop position is set to a timing near the bottom dead center BDC so as to increase the effective compression ratio, when engine 2 is restarted at the second closing timing IVC2, the temperature in the combustion chamber increases so that pre-ignition can be caused. Furthermore, since the effective compression ratio is high at the second closing timing IVC2, the engine vibration increases and the electric power required for cranking becomes high.

Thus, the effective compression ratio is decreased by retarding of the closing timing IVC of the intake valve 24 to the first closing timing IVC1 that is more retarded than the second closing timing IVC2, in other words, by retarding the closing timing IVC of intake valve 24 to the first closing timing IVC1 that is more retarded from the bottom dead center BDC than the second closing timing IVC2 is retarded from the bottom dead center BDC.

Thus, prevention of occurrence of pre-ignition, reduction of engine vibration, and decrease of electric power consumed by cranking can be realized by retarding the closing IVC from the second closing timing IVC2 toward the first closing timing IVC1 while the engine 2 stops.

Furthermore, the control to retard the closing timing IVC from the second closing timing IVC2 toward the first closing timing IVC1 is performed by increasing the valve working angle by lift-variable mechanism 31.

Accordingly, the closing timing IVC of the intake valve 24 is retarded to the first closing timing IVC1, and the opening timing IVO of the intake valve 24 is advanced through the angle of difference between the first closing timing IVC1 and the second closing timing IVC2, without change of the center phase of the valve working angle.

Although phase-variable mechanism 32 for changing the center phase of the camshaft with respect to the crankshaft cannot perform the advance or retard angle change of the center phase while the engine stops, lift-variable mechanism 31 can change the valve working angle even during engine stop, so that the closing time IVC can be retarded by increasing the valve working angle by lift-variable mechanism 31.

By retarding the closing timing IVC to the first closing timing IVC1 in advance while engine 2 stops, cranking can be started in a low effective compression ratio state.

At step S105, whether or not there is a start request of engine 2, and the routine waits until start request occurs. When a start request occurs, the routine advances to step S106.

The start request of engine 2 is determined based on the conditions such as an accelerator opening, a gear shift position, a rotating speed of electric motor 3, a vehicle speed, etc.

At step S106, electric motor 3 is actuated so that engine 2 is cranked at an output torque of electric motor 3, and fuel injection and spark to the engine are caused.

At step S107, the engine rotating speed NE and the threshold NEKB are compared, and if the engine rotating speed NE is less than the threshold NEKB, it is determined that startup of engine 2 is not completed, and the routine returns to step S106 in which cranking of engine by use of electric motor 3 is maintained.

The threshold NEKB is set to a rotating speed that satisfies the relationship 0 rpm <NEKB< a target idle rotating speed NETG, and a rotating speed that engine 2 can maintain its operation even if the cranking of engine 2 by electric motor 3 is stopped.

When it is determined that the engine rotating speed NE reaches or exceeds the threshold NEKB and the startup of engine 2 is completed, the routine advances to step S103 in which the cranking by electric motor 3 is stopped.

When the startup of engine 2 is completed, the routine advances to step S109 in which it is determined whether or not a current engine rotating speed NE is higher than a first threshold. The first threshold is a rotating speed that is higher than the target idle rotating speed NETG by a set value $\Delta NE1$ ($\Delta NE1 \geq 0$).

The target idle rotating speed NETG is set to be variable according to a cooling water temperature, an external load, etc.

If it is just after completion of startup is determined and it is determined that the engine rotating speed does not exceed the first threshold, the routine advances to step S110 in which a flag FUP is determined.

The initial value of the flag FUP is 0 (zero), and the flag FUP is set to 1 when the engine rotating speed NE exceeds the first threshold, as described later. Thus, if the engine rotating speed NE is less than the first threshold just after it exceeds the threshold NEKB, the flag FUP is determined to be 0 (zero), and the routine is just terminated. In this case, the closing timing IVC of intake valve 24 is maintained at the first closing timing IVC1.

If the engine rotating speed NE continues increasing after completion of engine start and the engine rotating speed NE revs ups exceeds the first threshold value, the routine advances to step S111 in which the flag FUP is set to 1, and then the routine advances to step S112 in which the closing timing IVC of intake valve 24 is retarded from a current value by a correction value $\Delta RE$.

The aforementioned retard angle correction of a closing timing IVC is performed at least on of by an increase correction of a target valve working angle and by a retard angle correction of a target center phase. When a state in which the engine rotating speed NE exceed the first threshold is maintained, the first closing timing IVC1 is set as an initial value, and the closing timing IVC is shifted to the retard angle side by a correction value $\Delta RE$ at a time.

The aforementioned correction value $\Delta RE$ is adapted in advance so that a significant drop in engine rotating speed is not caused while controlling rev-up of the engine with good response.

Furthermore, when the target valve working angle is controlled to be near the maximum value in order to realize the first closing timing IVC1, the closing timing IVC can be retarded by a retard angle correction of a target center phase without changing the target valve working angle. In addition, if the increase correction of a target valve working angle and the retard angle correction of a target center phase are performed in parallel, the closing timing IVC can be changed to the retard angle side with better response.

As described above, changing the closing timing IVC to the retard angle side against rev-up of the engine rotating speed NE just after startup thereof decreases the intake air flow rate to the cylinder decreases, so that the rev-up is suppressed.

As described above, the first closing timing IVC1 is set to a timing near 80 degrees after the bottom dead center, and the change to retard beyond this first closing timing IVC1 is intended for further decreasing the intake air flow rate, so that the rev-up can be appropriately suppressed with good response.

For example, if the valve timing is controlled so that the closing timing IVC occurs near the bottom dead center BDC with a small valve working angle, it is necessary to decrease the valve working angle and to significantly advance the closing timing IVC from the first closing timing IVC1 to the bottom dead center. As a result, a response delay of lift-variable mechanism 31 and phase-variable mechanism 32 increases, and it becomes difficult to control rev-up of the engine with good response.

In contrast, when the closing timing is retarded from the first closing timing IVC1, change of retard angle immediately makes an effect in the direction of suppressing rev-up, so that rev-up just after engine start can be suppressed with good response.

If a state in which the engine rotating speed NE exceeds the first threshold is maintained, the routine advances to step S112 in a constant cycle so that the closing timing IVC is gradually retarded. When the engine rotating speed NE decreases to or below the first threshold as a result of suppressing rev-up, the routine advances from step S109 to step S110. In the present case, since the state that the engine rotating speed NE exceeds the first threshold is experienced, and the flag FUP is set to 1, the routine advances from S110 to S113.

At step S113, whether or not a current engine rotating speed NE is less than a second threshold is determined. The aforementioned second threshold is a rotating speed that is lower than the target idle rotating speed NETG by a set value $\Delta NE2$.

If the retard angle correction of a closing timing IVC is excessive so that the engine rotating speed become less than the second threshold, the routine advances to step S114 in which the current closing timing IVC is advanced by a correction value $\Delta AD$.

The aforementioned advance angle correction of a closing timing IVC is performed at least one of by a decrease correction of a target valve working angle by an advance angle correction of a target center phase. When a state in which the engine rotating speed NE is less than the second threshold is maintained, the closing timing IVC is advanced toward the first closing timing IVC1 by a correction value $\Delta AD$ at a time, assuming that the first closing timing IVC1 is a limit.

The aforementioned correction value $\Delta RE$ is adapted in advance so that a recurrence of rev-up is prevented while suppressing a drop of engine rotating speed with good response.

If the closing timing IVC of intake valve is advanced close to the bottom dead center BDC, the intake air flow rate to the cylinder increases, so that the engine rotating speed NE that is less than the target idle rotating speed NETG by the amount of hysteresis $\Delta NE2$ or more can be increasingly changed toward the target idle rotating speed NETG.

The amount of hysteresis $\Delta NE1$ and the amount of hysteresis $\Delta NE2$ may be the same rotating speed or may be different values. Similarly, the correction value ΔRD and the correction value ΔAD may be the same angle or may be different values.

As described above, if rev-up of engine rotating speed NE occurs after completion of startup, the closing timing IVC retarded. Then, if the engine rotating speed NE becomes less than the target idle rotating speed NETG due to excessive retard angle correction of this closing timing IVC, the closing timing IVC if advanced close to the bottom dead center assuming that the first closing timing IVC1 is a limit.

At step S114, as a result of controlling the engine rotating speed NE by the aforementioned correction of the closing timing IVC, whether or not the engine rotating speed NE is converged to within the range between the second threshold and the first threshold, in other words, whether or not the engine rotating speed NE is converged to near the target idle rotating speed NETG, is determined.

At this time, it is determined that the engine rotating speed NE is converged to near the target idle rotating speed NETG when a duration of the state in which the engine rotating speed NE is higher than the second threshold and is lower than the first threshold exceeds a set time. On the other hand, even in a state in which the idle engine rotating speed NE is higher than the second threshold and is lower than the first threshold, if a duration of such a state is less than the aforementioned set time, it is determined that the engine rotating speed NE is not converged to near the target idle rotating speed NETG.

If the engine rotating speed NE is not converged to near the target idle rotating speed NETG, the routine returns to step S109 in which the closing timing IVC change process is maintained so that the engine rotating speed NE at this time is changed close to the target idle rotating speed NETG.

On the other hand, if the engine rotating speed NE is converged to near the target idle rotating speed NETG, control of the closing timing IVC is terminated, and thereafter, lift-variable mechanism 31 and phase-variable mechanism 32 are controlled according to the target valve working angle and target center phase which are set based on an engine load and engine rotation.

At a time of vehicle start-up, the vehicle is started by the output torque When the vehicle is started by an output torque from engine 2 and an output torque from electric motor 3.

In the following, valve timing change during a time from low speed driving to vehicle start-up through idle reduction will be described in connection with FIG. 5.

First, during constant low speed driving, in order to improve fuel efficiency, the valve working angle is set less than 180 degrees, and a valve timing is controlled so that the opening timing IVO occurs near the top dead center TDC, and the closing timing IVC occurs for example, between 30 degrees and 60 degrees before the bottom dead center.

Then, when the constant low speed driving is shifted to a state of fuel cut in vehicle deceleration, the valve working angle is increased to the maximum or near the maximum in order to reduce a pumping loss of engine 2 and the center phase is retarded, so that the closing timing IVC is retarded to a timing at near 90 degrees after the bottom dead center. At just before a stop of engine 2, the closing timing IVC is changed to advance to the second closing timing near the bottom dead center BDC so as to stabilize an engine stop position by increasing the effective compression ratio.

When engine 2 stops, the valve working angle is increased to retard the closing timing IVC, so that the closing timing IVC is controlled in advance to be set to the first closing timing IVC1 that is suitable for engine start. Thus, an effective compression ratio at engine restart is decreased, so that pre-ignition is suppressed, engine vibration is reduced, and cranking electric power is decreased.

When engine 2 started with the closing timing IVC of intake valve 24 being the first closing timing IVC1, and engine start is completed, and then rev-up of the engine exceeds a target idle rotating speed NETG, the rev-up of engine 2 is suppressed by further retarding the closing time IVC of intake valve 24 beyond the first closing timing IVC1.

Thus, retarding beyond the first closing timing IVC1 immediately operates to suppress a rise in engine rotating speed, so that the rev-up of the engine can be suppressed with good response.

When the re-up of engine is suppressed and the engine rotating speed NE is converged to near a target idle rotating speed NETG, the retard angle correction or advance angle correction of the closing timing IVC for suppressing the rev-up is terminated. When the vehicle is started after that, the effective compression ratio is increased by advancing the closing timing IVC toward the bottom dead center BDC so that an accelerating ability from standstill is ensured.

FIG. 6 is a time chart illustrating change of a closing timing IVC of intake valve 24 in combination with change of an engine rotating speed NE when the variable valve mechanism control according to the embodiment is performed.

Before a start request for engine 2 occurs, at time t1, the closing timing IVC is pre-retarded from the second closing timing IVC2 for stabilizing the stop position of engine 2, to the first closing timing IVC1 suitable for starting engine 2.

When the start request occurs at t1, engine 2 is cranked by actuating electric motor 3, and at t2, fuel injection and ignition are started.

At time t3 during cranking by use of electric motor 3 is maintained, if it is determined that the engine rotating speed NE exceeds a threshold NEKB, it is regarded that start of engine 2 completes, and the actuation of electric motor 3 is terminated, and the cranking of engine 2 is stopped.

After start of engine 2 is completed at t3, the engine rotating speed NE continues increasing and exceeds the target idle rotating speed NETG, the rev-up of the engine is suppressed by further retarding the closing timing IVC of the engine rotating speed NE beyond the first closing timing IVC1 that is suitable for starting engine 2.

At t4 when the rev-up of the engine is suppressed and the engine rotating speed is converged near the target idle rotating speed NETG by the retard angle correction of the closing timing IVC, the control of the closing timing IVC for suppressing the rev-up is terminated.

After that, when a vehicle start-up request occurs at time t5, the effective compression ratio is increased by advancing the closing timing IVC beyond the first closing timing IVC1, so that an accelerating performance at vehicle start-up is ensured.

In the embodiment described above, lift-variable mechanism 31 may be a mechanism in which the center phase of the valve working angle does not change in association with a valve lift amount change and a valve working angle change. For example, lift-variable mechanism 31 may be a mechanism in which the center phase of the valve working angle changes by advance in association with an increasing change of the valve lift amount and the valve working angle.

Furthermore, in the embodiment described above, the engine controller 12 controls both lift-variable mechanism 31 and phase-variable mechanism 32. However, a system may be used therefor in which both or one of lift-variable mechanism 31 and phase-variable mechanism 32 are controlled by another controller that is provided apart from engine controller 12.

Furthermore, in the embodiment above, lift-variable mechanism 31 and phase-variable mechanism 32 are provided for variable valve mechanisms which allow the valve opening characteristics of intake valve 24 to be changed. However, a mechanism which allows at least the closing timing IVC of intake valve 24 to be changed during stop of engine 2 need be provided. Such a mechanism may be, for example, an engine including an electric phase-variable mechanism in which a motor is used for an actuator.

The entire contents of Japanese Patent Application No. 2010-059011, filed Mar. 16, 2010 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. In a hybrid vehicle having an engine which includes a variable valve mechanism that allows at least a closing timing of an intake valve to be changed, and having an electric motor that is directly connected to an output shaft of the engine, a control apparatus for controlling the variable valve mechanism, comprising:
   a first control unit that controls the variable valve mechanism while the engine stops in response to an engine stop request so that an intake valve closing timing is controlled to be set to a first closing timing for engine start, wherein the first closing timing is a timing after the bottom dead center; and
   a second control unit which when rev-up of the engine occurs after completion of engine restart, controls the variable valve mechanism so that the intake valve closing timing is changed toward a retard angle side beyond the first closing timing.

2. The control apparatus for controlling a variable valve mechanism in a hybrid vehicle according to claim 1,
   wherein the control apparatus further comprises a third unit for controlling the variable valve mechanism just before the engine stops in response to a stop request, so that the intake valve closing timing is controlled to set to a second closing timing that is set further than the first closing timing as viewed in an advance angle side, and
   wherein the first control unit changes the intake valve closing timing by retarding the intake valve closing timing from the second closing timing toward the first closing timing.

3. The control apparatus for controlling a variable valve mechanism in a hybrid vehicle according to claim 2,
   wherein the third control unit sets the second closing timing to a timing that is after the bottom dead center and that is further than the first closing timing as viewed in the advance angle side.

4. The control apparatus for controlling a variable valve mechanism in a hybrid vehicle according to claim 1,
   wherein during a period from completion of engine start to convergence of the rotating speed of the engine, the second control unit changes the intake valve closing timing toward the retard angle side if the engine rotating speed exceeds a first threshold, and the second control unit changes the intake valve closing timing toward an advance angle side if the engine rotating speed is less than a second threshold, the second threshold being equal to or less than the first threshold.

5. The control apparatus for controlling a variable valve mechanism in a hybrid vehicle according to claim 1,
   wherein a valve lift variable mechanism and a phase variable mechanism are provided for the variable valve mechanisms, the valve lift variable mechanism allowing a valve lift amount and a valve working angle of the intake valve to be continuously and simultaneously changed, and a phase variable mechanism allowing a center phase of a valve working angle of the intake valve to be continuously changed by continuously changing a rotating phase of an intake camshaft with respect to a crankshaft of the engine, and
   wherein the first control unit controls the intake valve closing timing to be set to the first closing timing by controlling the valve lift variable mechanism so that a valve working angle of the intake valve is changed.

6. The control apparatus for controlling a variable valve mechanism in a hybrid vehicle according to claim 1,
   wherein the first control unit sets the first closing timing to a timing between 60 degrees after the bottom dead center and 110 degrees after the bottom dead center.

7. The control apparatus for controlling a variable valve mechanism in a hybrid vehicle according to claim 1,
   wherein the first control unit sets the first closing timing to be near 80 degrees after the bottom dead center.

8. The control apparatus for controlling a variable valve mechanism in a hybrid vehicle according to claim 1,
   wherein the first control unit controls the variable valve mechanism while the engine stops for idle reduction, and
   wherein the second control unit controls the variable valve mechanism when the engine is restarted from idle reduction.

9. The control apparatus for controlling a variable valve mechanism in a hybrid vehicle according to claim 4,
   wherein the second closing unit sets the first threshold to an engine rotating speed higher than a target idle rotating speed, and sets the second threshold to an engine rotating speed lower than a target idle rotating speed.

10. The control apparatus for controlling a variable valve mechanism in a hybrid vehicle according to claim 2,
    wherein the third control unit sets the second closing timing to a timing after the bottom dead center, and
    wherein the control apparatus further comprises a fourth control unit for controlling the variable valve mechanism during engine deceleration and fuel cut, so that the intake valve closing timing is controlled to be set to a third closing timing that is set further than the first and second closing timings as viewed in the retard angle side.

11. The control apparatus for controlling a variable valve mechanism in a hybrid vehicle according to claim 10,
    wherein the fourth control unit sets the third closing timing to at near 90 degrees after the bottom dead center.

12. The control apparatus for controlling a variable valve mechanism in a hybrid vehicle according to claim 10,
    wherein a valve lift variable mechanism which allows a valve lift amount and a valve working angle of the intake valve to continuously and simultaneously changed, and a phase variable mechanism which allows a center phase of a valve working angle of the intake valve to be continuously changed by continuously changing a rotating phase of an intake camshaft with respect to a crankshaft of the engine are provided for the variable valve mechanisms, and wherein the third control unit advances the intake valve closing timing from the third closing timing to the second closing timing by controlling the valve lift variable mechanism to decrease a valve working angle and by controlling the phase lift variable mechanism to advance the center phase.

13. The control apparatus for controlling a variable valve mechanism in a hybrid vehicle according to claim 10,
wherein the third control unit determines a timing to start control for advancing the intake valve closing timing from the third closing timing to the second closing timing based on comparison between an engine rotating speed and a threshold value.

14. The control apparatus for controlling a variable valve mechanism in a hybrid vehicle according to claim 1,
wherein the second control unit gradually changes the intake valve closing timing from the first closing timing toward a retard angle side in a rev-up state.

15. The control apparatus for controlling a variable valve mechanism in a hybrid vehicle according to claim 1,
wherein the control apparatus comprises, as the variable valve mechanism, a variable valve mechanism in which a motor is used for an actuator, and
wherein the first control unit controls the intake valve closing timing to be set to the first closing timing by controlling the motor.

16. The control apparatus for controlling a variable valve mechanism in a hybrid vehicle according to claim 1,
further comprising a fifth control unit for controlling the intake valve closing timing to be set to a timing before the bottom dead center by controlling the variable valve mechanism.

17. In a hybrid vehicle having an engine which includes a variable valve mechanism that allows at least a closing timing of an intake valve to be changed, and having an electric motor that is directly connected to an output shaft of the engine, a control apparatus for controlling the variable valve mechanism, comprising:
a first control means for controlling the variable valve mechanism while the engine stops in response to an engine stop request so that an intake valve closing timing is controlled to be set to a first closing timing for engine start, wherein the first closing timing is a timing after the bottom dead center; and
a second control means for when rev-up of the engine occurs after completion of engine restart, controlling the variable valve mechanism so that the intake valve closing timing is changed toward a retard angle side beyond the first closing timing.

18. In a hybrid vehicle having an engine which includes a variable valve mechanism that allows at least a closing timing of an intake valve to be changed, and having an electric motor that is directly connected to an output shaft of the engine, a control method of controlling the variable valve mechanism, comprising the steps of:
controlling the variable valve mechanism while the engine stops in response to a stop request so that an intake valve closing timing is controlled to be set to a first closing timing that for engine start, wherein the first closing timing is a timing after the bottom dead center; and
when rev-up of the engine occurs after completion of engine restart, controlling the variable valve mechanism so that the intake valve closing timing is changed toward a retard angle side beyond the first closing timing.

19. The control method for controlling a variable valve mechanism in a hybrid vehicle according to claim 18, further comprising the step of
controlling the valve variable mechanism just before the engine stops in response to a stop request so that the intake valve closing timing is controlled to be set to a second closing timing that is a timing which is further than the first closing timing as viewed in an advance angle side and which is at after the bottom dead center,
wherein the step of controlling the intake valve closing timing to be set to the first intake valve closing timing is changing the intake valve closing timing by retarding from the second closing timing toward the first closing timing.

20. The control method for controlling a variable valve mechanism in a hybrid vehicle according to claim 19, further comprising the step of controlling the variable valve mechanism during engine deceleration and fuel cut, so that the intake valve closing timing is controlled to be set to a third closing timing that is set further than the first and second closing timings as viewed in the retard angle side.

* * * * *